United States Patent Office 3,403,784
Patented Oct. 1, 1968

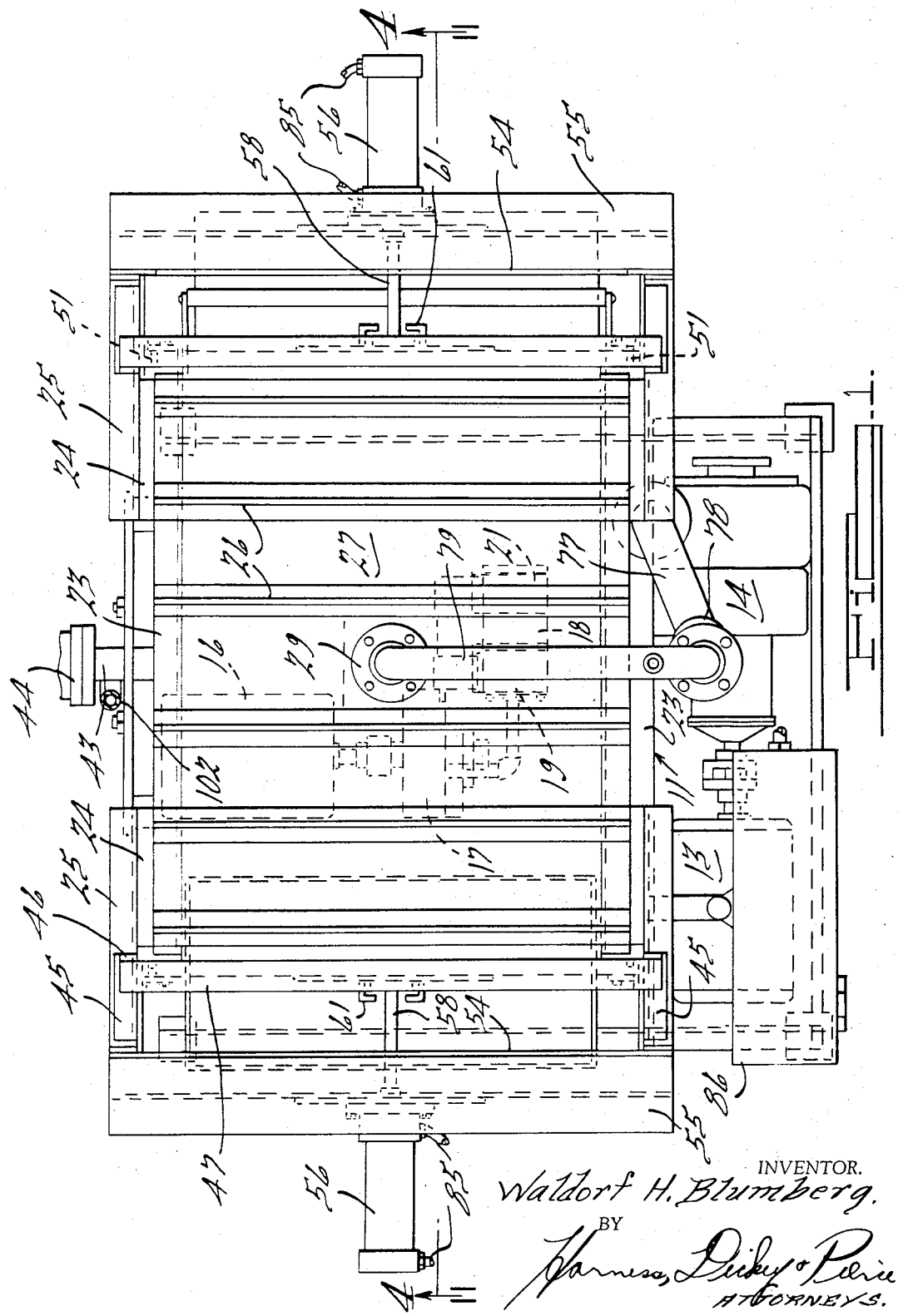

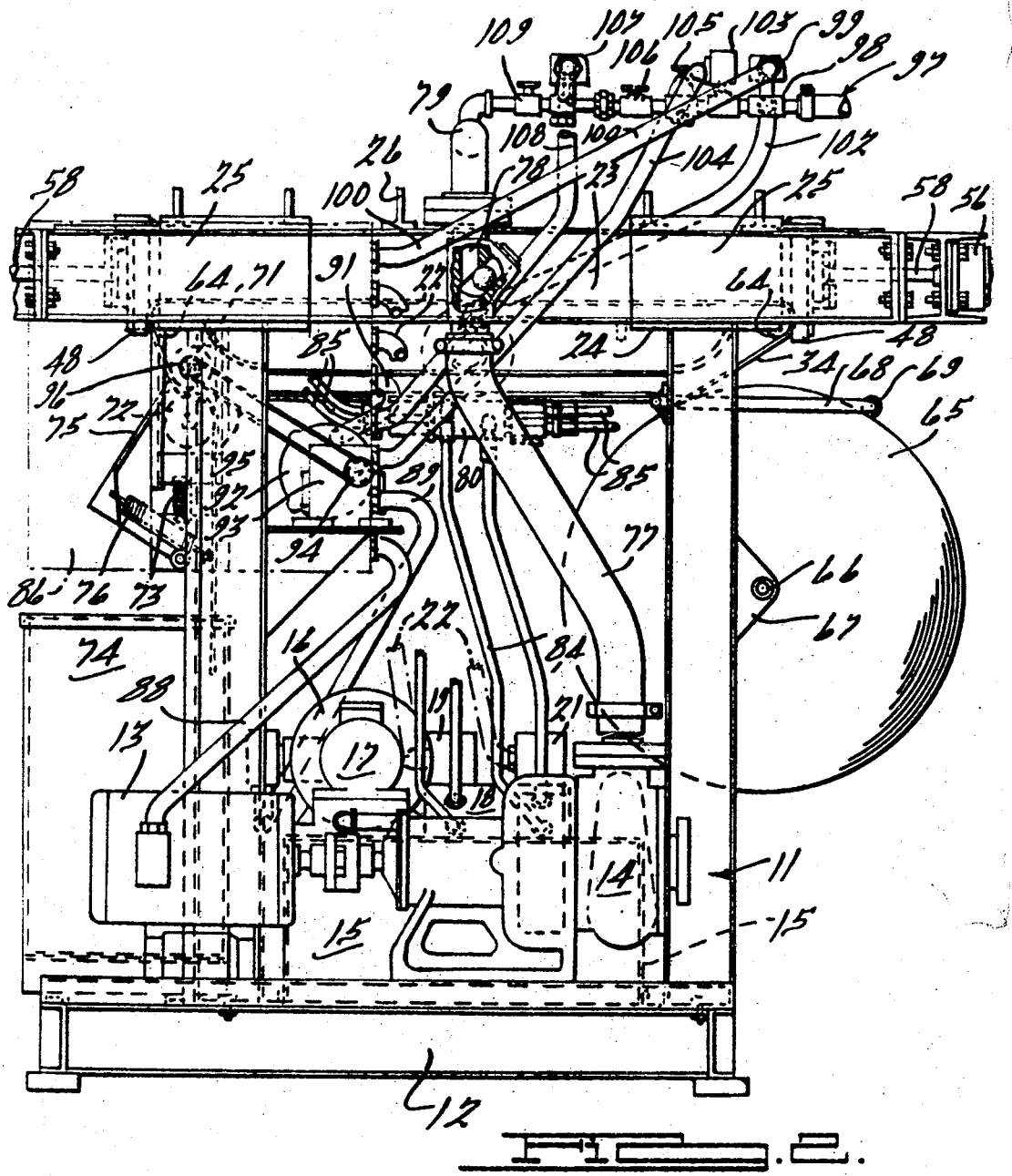

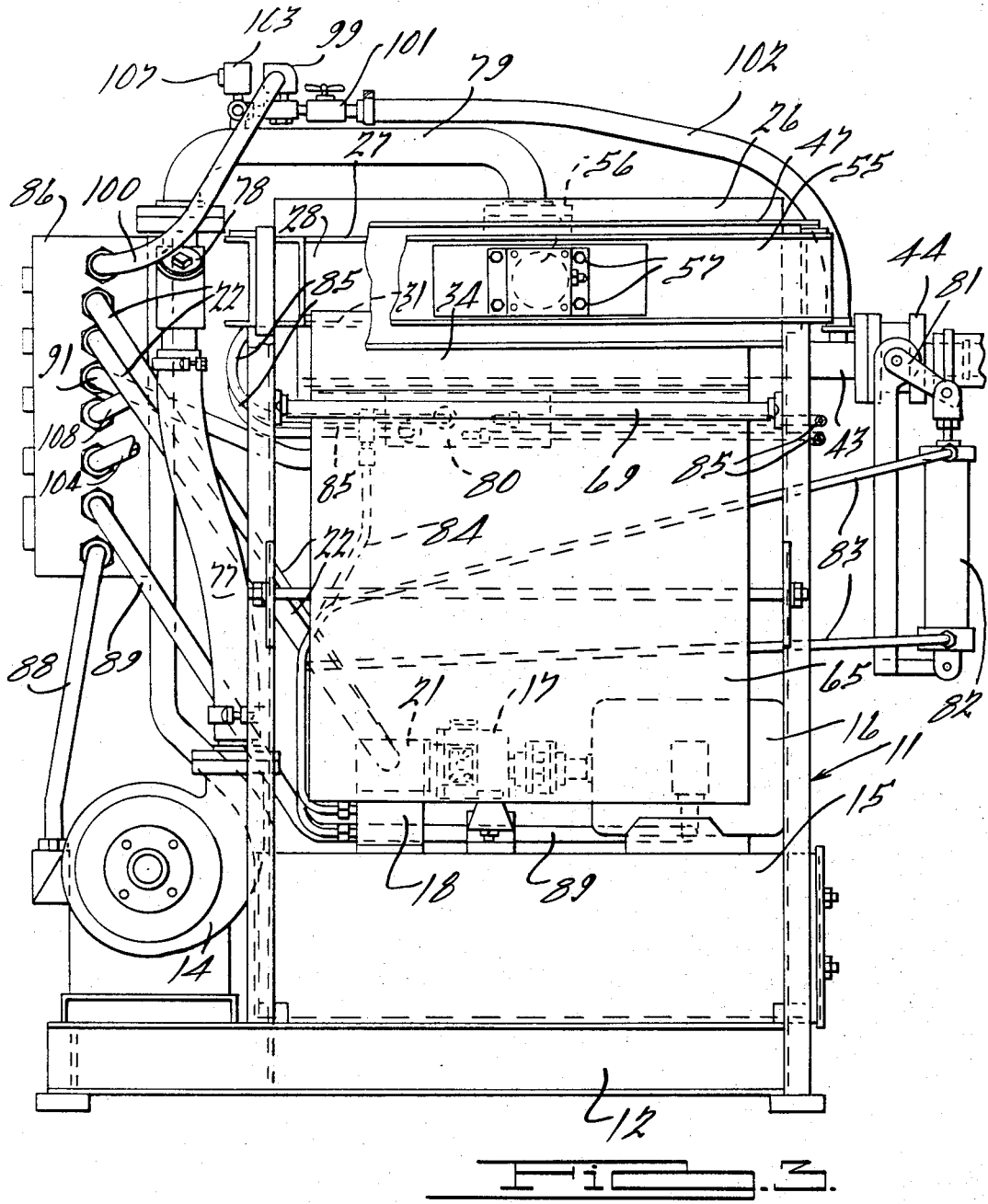

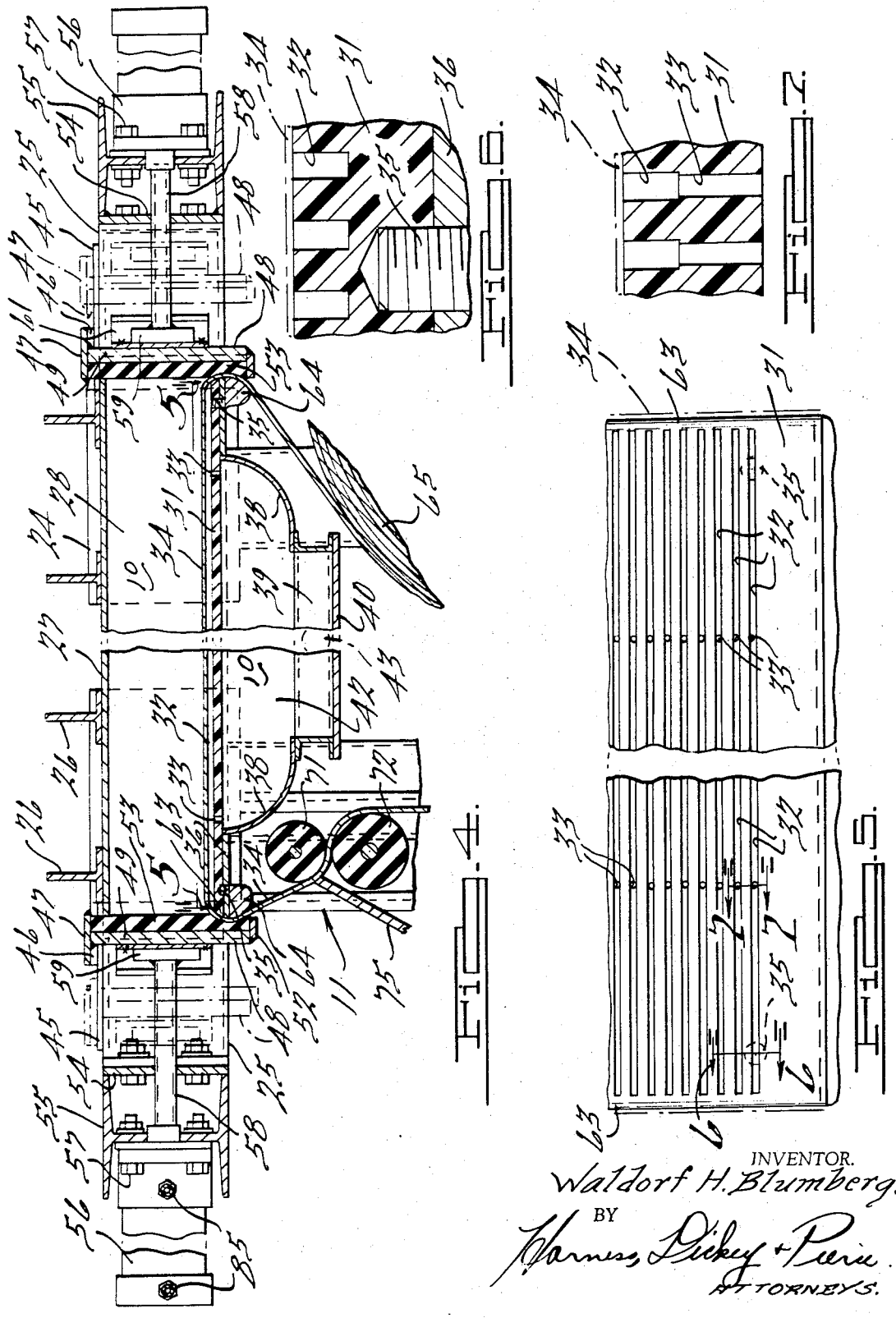

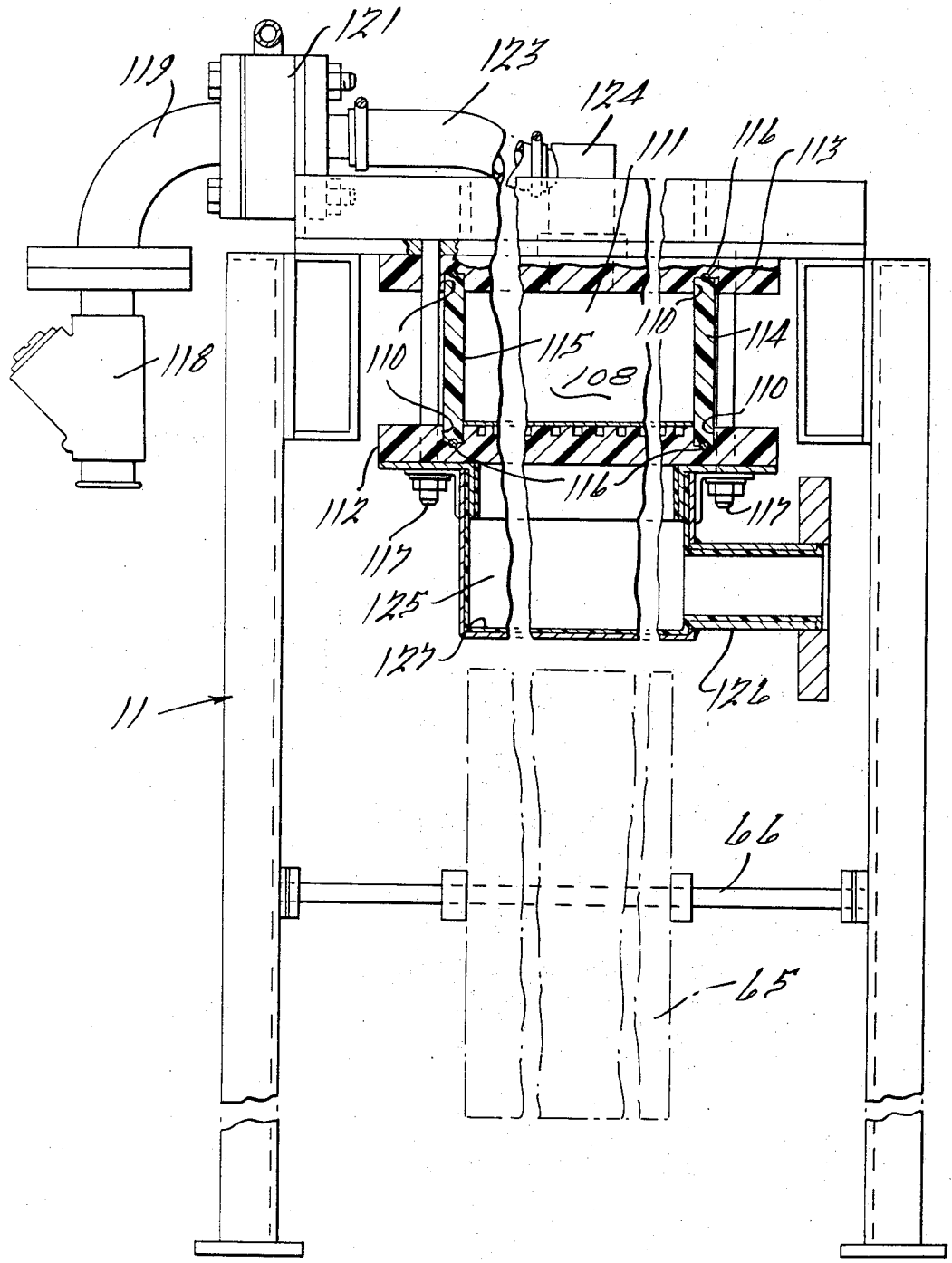

3,403,784
FILTER MACHINE AND METHOD
Waldorf H. Blumberg, Southfield, Mich., assignor to Detroit Filter Corporation, Detroit, Mich., a corporation of Michigan
Filed May 11, 1967, Ser. No. 637,671
9 Claims. (Cl. 210—67)

ABSTRACT OF THE DISCLOSURE

A filter comprising a sealable chamber and a perforate platen therein. A filter sheet in drawn across the platen from a roll. The fluid to be filtered passes downwardly through the sheet and platen during filtration and compressed air is forced upwardly to levitate the filter to facilitate movement of the filter media to replace the same.

---

This invention relates to filter machines and methods and more particularly to an automatic filter wherein the filter media is sealed against a perforate platen by a combination of capillary action and a liquid pressure differential across the media during the filtering process and wherein the filter media is levitated above the platen by an air pressure differential across the media to facilitate media change.

Background of the invention

Automatic filter machines heretofore known in the art either utilize separable chambers that clamp the media between portions and then release the media for change or support the filter media on a rotatable drum which carries the media through the filter. Such filters are, therefore, relatively expensive and inefficient compared to the machine of the instant invention.

Summary of the invention

The media is initially sealed against the platen by a combination of capillary action and inlet fluid pressure. Thereafter, because the media is thoroughly saturated with liquid during the filtering cycle and is therefore relatively weak, it is levitated above the platen by air pressure under the media as it is being pulled through the filter during the media renewal portion of the cycle.

Brief description of the drawings

FIGURE 1 is a plan view of the filter machine embodying features of the present invention;

FIG. 2 is a broken side view of the machine illustrated in FIG. 1, as viewed from the bottom thereof;

FIG. 3 is a broken end view of the machine illustrated in FIG. 1, as viewed from the right end thereof;

FIG. 4 is an enlarged broken sectional view of the structure illustrated in FIG. 1, taken on the line 4—4 thereof;

FIG. 5 is a broken sectional view of the structure illustrated in FIG. 4, taken on the line 5—5 thereof;

FIG. 6 is an enlarged broken sectional view of the structure illustrated in FIG. 5, taken on the line 6—6 thereof;

FIG. 7 is an enlarged broken sectional view of the structure illustrated in FIG. 5 taken on the line 7—7 thereof, and FIG. 8 is a broken sectional view of the structure, similar to that illustrated in FIG. 1, showing another form which the invention may assume.

Description of the preferred embodiments

Referring to FIGS. 1 to 7, the filter of the present invention comprises a sealable fluid chamber 10 that is supported by a frame 11. The frame 11 has a bottom bed 12 on which an electirc motor 13 and a pump 14 are supported in driving relation. The bed also supports a tank 15 on which a motor 16 and pump 17 along with a manifold 18 are mounted. The pump 17 provides fluid under pressure for operating various devices controlled by four-way valves 19 and 21 which are solenoid operated and energized by electrical conductors carried in conduits 22.

The frame 11 supports a pair of aligned horizontal outwardly directed channel members 23 which are welded to plates 24. The plates 24 have outwardly facing channel members 25 welded thereto and located beyond the ends of inverted T-shaped bracing elements 26. The brace elements 26 extend across the channel members 23 and a top closure plate 27. The channel members 23 and the plate 27 define an upper portion 28 of the sealable fluid chamber 10.

Fluid enters through a coupling element 29 at the center of the plate 27.

A horizontally disposed platen 31, of plastic material such as polypropylene, divides the chamber into an upper portion 28 and a lower portion 42. The platen 31 has spaced longitudinal slots 32 therein which communicate with a plurality of apertures 33 through the bottom of the platen.

As illustrated in FIGS. 6 and 7, a sheet type filter media 34 is supported by the platen 31, liquid passing through the media collecting in the slots 32 and thereafter draining through the apertures 33. The platen 31 is secured by a pluraility of screws 35 to a plate 36. Bottom panels 38, 39 and 40 are secured to the plate 36 to form the lower chamber 42. The lower portion 42 of the fluid chamber is connected by a conduit 43 to an outlet valve 44.

The members 25 at each end of the channel members 23 have bearing plates 45 on a top flange thereof that are engaged by a bearing plate 46 secured at each end of a cross member 47. The cross member 47 forms the top wall of a closure door 48 at each end of the upper portion 28 of the fluid chamber 10. Each door 48 has a plate 49 welded to the cross members 47 and has side members 51 and a bottom member 52 welded thereto. The cross member 47 in conjunction with the side and bottom members 51 and 52 form a recess for receiving and supporting a sealing element 53 of resilient material. The doors are illustrated in closed position in FIG. 4 and are shown in open position in dot and dash lines.

A cross plate 54 spans the ends of the channel members 25 and has an H-shaped element 55 welded thereto at the center for supporting a hydraulic cylinder 56 which is secured thereto by bolts 57. A piston rod 58 extends from each cylinder through an aperture in the plate 54 and has a head 59 on the extending end. The head 59 slides in a slot formed by two spaced angle-shaped members 61 and when moved forwardly moves the plate 49 and the resilient sealing element 53 forwardly against the ends of the upper inlet portion 28 of the sealable chamber 10 in sealed relation thereto. The reverse movement of the piston rods 58 draws the heads 59 against the flanges of the members 61 and moves the doors 48 to open position as illustrated in the dot and dash line position.

The platen 31 has arcuate ends 63 which in conjunction with a semicylindrical element 64 form semicylindrical ends over which the filter media 34 is drawn.

As illustrated in FIG. 3, the filter media 34 is drawn from a roll 65 mounted on a rod 66 which is supported on bosses 67 welded to the frame 11. A pair of pivoted arms 68 support a rod 69 which prevents overrunning of the roll when the filter media 34 is advanced therefrom.

The lefthand end of the machine has a driven roller 71 and a second roller 72 which is pressed thereagainst by springs 73. When both of the doors 48 are moved to open position the used portion of the filter media is advanced across the platen 31 by the rollers 71 and 72 into a container 74. A doctor blade 75 is urged against the filter media 34 by a spring 76 to remove collected filter residue therefrom before passing between the rollers 71 and 72. Such material will pass from the blade into the container 74.

A conduit 77 extends upwardly from the pump 14 and is connected to a ball check valve 78 and to a branch conduit 79 to the coupling element 29 in the center of the top closure plate 27. The outlet valve 44 has an operating arm 81, as illustrated in FIG. 3 actuated by a ram 82 by fluid from conduits 83 which are connected to the manifold 18. A manifold 80 has fluid delivered thereto and therefrom by a pair of conduits 84 from which it is delivered by pairs of conduits 85 to opposite ends of the rams 58. A control box 86 contains the electrical control panel for operating the various elements of the machine in predetermined timed relationship. An electric conduit 88 extends from the box 86 to the motor 13 and an electric conduit 89 therefrom is connected to the motor 16. A conduit 91 from the box connects a circuit to a motor 92 which drives through a gear box 93 to drive a sprocket 94. The sprocket drives a chain 95 which drives a sprocket 96 on the shaft of the roller 71.

An air supply conduit 97 has a T 98 connected to a solenoid valve 99 operated from a conduit 100. The valve 99 is connected to a manual operated valve 101 and conduit 102 to the outlet conduit 43. The air supply conduit 97 has a pressure responsive valve 103 therein joined by an electric conduit 104 to the panel circuit. A pressure regulator valve 105 is in the air circuit along with a manual operated valve 106. A solenoid operated valve 107 in the circuit is connected by an electric conduit 108 to the panel circuit. Air will pass from the valve 107 through a check valve 109 into the branch conduit 79. The panel circuit is not shown as anyone skilled in the electrical art can interconnect the relays, timers, switches and the like to provide a desired sequence of operation.

The filter media is of the sheet type and may have any desired characteristic depending upon the type of fluid to be filtered. One such filter media comprises paper fibers having carbon particles therebetween. Various bonds including those of the resin types may be employed for retention of the fibers.

In operation, after the filter media 34 has been advanced to provide a new length thereof on the top of the platen 31, the two doors 48 are closed to seal the ends of the media 34 and the fluid chamber 10 by the forward simultaneous movement of the piston rods 58. Thereafter, the motor 13 is energized to drive the pump 14 to deliver liquid to be filtered into the upper portion 28 of the fluid chamber 10 centrally of the top closure plate 27 through the central coupling element 29.

In accordance with one feature of the instant invention, pressure of the fluid and subsequent capillary action will force the filter media 34 downwardly to seal the periphery thereof against the platen 31. Fluid passing through the filter media 34 passes into the slots 32 and thereafter through the apertures 33 into the lower portion 42 of the fluid chamber 10 from which it is pumped through the conduit 43 and valve 44 connected thereto.

After a predetermined time, which is empirically determined from the fluid to be filtered, the pump is shut off and the valve 107 is opened to produce a flow of air into the branch conduit 79 and the upper portion 28 of the fluid chamber 10. The ball check valve 78 closes down to seal conduit 77 so that the air pressure in the upper portion 28 of fluid chamber 10 forces any remaining fluid quickly through the filter media 34. After a short time interval, the cylinders 56 are energized to retract the doors 48 to release the ends of the filter media 34. Thereafter, the valve 107 is closed, the valve 99 is opened and the valve 44 is closed whereby air under pressure is directed into the conduit 43 and into the lower portion 42 of the fluid chamber 10.

In accordance with the instant invention, pressurized air passes upwardly through the apertures 33 and slots 32 creating a pressure differential across the wet filter media which raises the filter media 34 off the platen 31 and levitates it above the surface thereof so that it can be easily advanced. Thereafter, the motor 92 is energized so as to rotate the roll 71 a predetermined number of revolutions thereby to advance the filter media 34.

It is desirable to coat the inner walls of the fluid chamber 10 with a coating such as plastic or the like, to limit oxidation and any attack by acid or basic solutions. The platen 31 as pointed out above, is made from plastic sheet.

In FIG. 8, a fluid chamber 108 is illustrated having a platen 112 made from plastic sheet similar to the platen 31 of the structure above described. A top plate 113, of plastic material, is joined to the platen 112 by plastic side sheets 114 and 115. As herein illustrated, the platen 112 and top sheet 113 are provided with aligned slots 110 for the acceptance of the edges of the side sheets 114 and 115. Rubber seal strips 116 are provided at the bottoms of the slots 110, bolts 117 clamping the assembly together. Preferably, a ball check valve 118, elbow 119, air intake element 121, conduit 123 and the connecting head 124 are all made of acid resistant plastic material. A lower portion 125 of the fluid chamber 108 and an outlet conduit 126 are lined with an acid resistant coating 127 to prevent the deterioration thereof. Otherwise, the structure of FIG. 8 is structurally and functionally similar to that of FIGURES 1 to 7.

What is claimed is:
1. A filter comprising
   a chamber for the acceptance of a fluid,
   a perforate platen in said chamber,
   a filter media having a filtering portion normally disposed in juxtaposed relation to said platen, and
   means for creating an air pressure differential across said filter media to levitate the entire filtering portion thereof relative to said platen to facilitate movement of said filter media relative to said platen.
2. A filter in accordance with claim 1 wherein said chamber is sealable, and
   means in said chamber openable to permit movement of said media through said chamber.
3. A filter in accordance with claim 2 wherein said platen has a plurality of parallel grooves extending at right angles to said openable means and the perforations in said platen communicate with said grooves.
4. A filter in accordance with claim 1 wherein said filter media moves in one direction relative to said platen under the influence of said air pressure differential and in another direction normal to said one direction to effect change thereof.
5. The method of filtering a fluid comprising the steps of
   supporting a filter media on a perforate platen,
   filtering a fluid through said filter media, and
   levitating the entire filtering portion of said media relative to said platen to facilitate movement of said media relative to said platen.
6. The method of claim 5 wherein levitation of said media is achieved by pumping air through said platen from the opposite side thereof from said media to create an air pressure differential across said media.
7. The method of claim 5 including the step of forcing said fluid through said filter media under pressure.
8. The method of claim 5 including the steps of
   enclosing said media in a chamber, and
   opening said chamber to facilitate change of said media.
9. The method of claim 5 including the step of
   creating a first air pressure differential across said media to effect blowdown of said fluid, and
   creating a second air pressure differential across said media in the opposite direction to said first air pressure differential to levitate the entire filtering portion of said media above said platen.

References Cited

UNITED STATES PATENTS

| | | | |
|---|---|---|---|
| 756,600 | 4/1904 | Dodge | 198—184 X |
| 1,170,209 | 2/1916 | Wood | 271—74 |
| 2,848,113 | 8/1958 | Paterson et al. | 210—400 X |
| 2,867,324 | 1/1959 | Hirs | 210—387 X |
| 3,244,281 | 4/1966 | Kurz et al. | 210—67 |

SAMIH N. ZAHARNA, *Primary Examiner.*